US008724860B2

(12) United States Patent
Dinh

(10) Patent No.: US 8,724,860 B2
(45) Date of Patent: *May 13, 2014

(54) APPARATUS FOR FINGERPRINT SENSING AND OTHER MEASUREMENTS

(75) Inventor: Ngoc Minh Dinh, Oslo (NO)

(73) Assignee: Next Biometrics Group AS, Nesoya (NO)

( * ) Notice: Subject to any disclaimer, the term of this patent is extended or adjusted under 35 U.S.C. 154(b) by 1474 days.

This patent is subject to a terminal disclaimer.

(21) Appl. No.: 11/575,707

(22) PCT Filed: Sep. 22, 2005

(86) PCT No.: PCT/NO2005/000348
§ 371 (c)(1),
(2), (4) Date: Aug. 27, 2007

(87) PCT Pub. No.: WO2006/033582
PCT Pub. Date: Mar. 30, 2006

(65) Prior Publication Data
US 2008/0063246 A1    Mar. 13, 2008

Related U.S. Application Data

(60) Provisional application No. 60/611,716, filed on Sep. 22, 2004.

(51) Int. Cl.
*G06K 9/00* (2006.01)

(52) U.S. Cl.
USPC .......... 382/124; 340/5.53; 340/5.83; 713/186

(58) Field of Classification Search
USPC ........ 382/124–127; 283/68, 69, 78; 340/5.52, 340/5.53, 5.8–5.86; 356/71; 713/186; 902/3
See application file for complete search history.

(56) References Cited

U.S. PATENT DOCUMENTS

| 4,250,375 A | | 2/1981 | Tsutsumi et al. | |
| 4,582,985 A | * | 4/1986 | Lofberg | 235/380 |
| 5,302,022 A | * | 4/1994 | Huang et al. | 374/44 |
| 5,355,165 A | | 10/1994 | Kosonocky et al. | |
| 5,503,029 A | | 4/1996 | Tamori | |
| 6,091,837 A | * | 7/2000 | Dinh | 382/124 |

(Continued)

FOREIGN PATENT DOCUMENTS

| FR | 2340547 A1 | 9/1977 |
| JP | 2002085381 A | 3/2002 |
| WO | 03/098535 A1 | 11/2003 |

OTHER PUBLICATIONS

English Translation of Japanese Laid-Open Patent Publication No. 2002-085381, 8 pages, (Mar. 26, 2002).

(Continued)

*Primary Examiner* — Aaron W Carter
(74) *Attorney, Agent, or Firm* — Rothwell, Figg, Ernst & Manbeck PC

(57) ABSTRACT

Apparatus for measuring a pattern in a surface of an object, comprising a plurality of pixel or sensor elements being responsive to a physical parameter of the object surface, and means for establishing an overall, segmented picture related to said pattern, and also comprising at least one diode functionally associated with each sensor element for contributing to one or more of the following functions: selectively addressing said sensor element; activating said sensor element; and sensing of said physical parameter.

17 Claims, 7 Drawing Sheets

(56) References Cited

U.S. PATENT DOCUMENTS

| | | | |
|---|---|---|---|
| 6,108,438 A * | 8/2000 | Bird et al. | 382/124 |
| 6,327,376 B1 * | 12/2001 | Harkin | 382/124 |
| 6,494,616 B1 * | 12/2002 | Tokhtuev et al. | 374/137 |
| 6,647,133 B1 * | 11/2003 | Morita et al. | 382/124 |
| 7,910,902 B2 | 3/2011 | Dinh | |
| 8,180,120 B2 * | 5/2012 | Hook | 382/124 |
| 8,335,926 B2 * | 12/2012 | Clemmensen et al. | 713/186 |
| 2003/0215116 A1 | 11/2003 | Brandt et al. | |
| 2005/0171413 A1 * | 8/2005 | Blair | 600/310 |
| 2008/0063246 A1 * | 3/2008 | Dinh | 382/124 |

OTHER PUBLICATIONS

Non-final Office Action in related U.S. Appl. No. 11/229,834, 21 pages, (mailed May 2, 2008).
Final Office Action in related U.S. Appl. No. 11/229,834, 9 pages, (mailed Dec. 5, 2008).
Non-final Office Action in related U.S. Appl. No. 11/229,834, 8pages, (mailed Jul. 1, 2009).
Final Office Action in related U.S. Appl. No. 11/229,834, 10 pages, (mailed Feb. 25, 2010).
Final Office Action in related U.S. Appl. No. 11/229,834, 10 pages, (mailed Sep. 22, 2010).

* cited by examiner

APPARATUS FOR FINGERPRINT SENSING AND OTHER MEASUREMENTS

CROSS REFERENCE TO RELATED APPLICATION

This application is a 35 U.S.C. §371 National Phase Entry Application from PCT/NO2005/000348, filed Sep. 22, 2005, and designating the United States.

FIELD OF INVENTION

The invention primarily relates to a method and an apparatus for measuring patterns in a partially heat conducting surface, preferably a fingerprint. In its wider aspects the invention makes possible measurements also of other forms of patterns in or on a surface of various types of objects.

DESCRIPTION OF THE PRIOR ART

A number of different techniques to fingerprint image capturing have been described in the open literature. Generally, the sensor signal domain can be optical, electrical, pressure-related or thermal.

The older method based on ink and paper has proven to be unpractical. Optical sensors are typically large and bulky. A family of fingerprint recording devices makes use of a sensor array combined with a read out integrated circuit, both components being fabricated on the same substrate. The parameters measured by the sensors vary greatly. For example, various electrical properties characterising the finger skin pattern have been used as measuring parameters in different fingerprint sensing systems. Ohmic resistance, capacitance, complex impedance and electric fields have all been mentioned as possible parameters in the description of such systems. These types of sensors are subjected to potential damages from electrostatic discharges upon finger touching, as sensing electrodes are usually made opened and very close to the sensor surface. Other systems are based on pressure sensors (micro-switches, piezoelectric sensors, etc.). These pressure sensor based systems often include membranes or micro-membranes that must be very soft and at the same time be able to withstand wear, scratches and repeated deformations which can reduce the device lifetime.

One category of fingerprint reading systems is based on temperature sensor arrays. In this particular case, the equilibrium temperature of each sensor is a function of the thermal contact between the finger and the sensor. A good thermal contact, corresponding to fingerprint ridges, will typically induce a larger sensor temperature change than a bad thermal contact. The sensors for which the temperature remains unaffected by the finger contact, at least for some amount of time, correspond to fingerprint valleys. The problem with this approach is that any available temperature differentials will quickly fade away when the system naturally reaches a state of thermal equilibrium in a very short time. A quick sweeping of the fingerprint across a line sensor may capture the initial temperature differentials. However, this method requires more elaborated data processing algorithms to retrieve the full fingerprint representation. Moreover, it is much more demanding on the sensor response time and on the system data acquisition rate.

Since a fingerprint sensor may be exposed to long term use in varying and sometimes demanding conditions the sensor needs to have a robust surface, to be as insensitive to contaminations in the fingerprint and on the sensor as possible, and to be able to be screened electrically in order to avoid interferences from outside and to protect the sensor from electromagnetic discharges that can harm the electronic circuits in the sensor. It must be capable of reading most fingerprints without being severely disturbed by latent prints from earlier use. It must also be capable of reading worn fingerprints in which the pattern is no longer visible. In some applications, such as when integrated onto a contact/contact-less payment chip-cards/smartcards or electronic passports, a sensor should be made very compact, physically flexible (bendable), and should have lowest possible power consumption. In the view of costs there is also a demand for simplicity and minimizing of the number of parts.

The thermal sensor principle, as described in the U.S. Pat. No. 6,091,837, can satisfy the above-mentioned requirements. It makes use of heat transfer mechanism in order to distinguish fingerprint valleys and ridges, as their skin structures have different heat transfer characteristics. For this type of system, a sensor array is heated and the heat exchange between the finger and the underlying individual sensors is monitored through a sensor temperature variation measurement. A relative large sensor temperature indicates an accumulation of heat energy, in other words, a little heat loss or a small heat exchange between the considered sensor and the finger at this point. Small heat exchanges, in turn, correspond to low thermal conductivity (i.e. having low heat conduction /transfer) points for which the thermal contact between the finger and the sensor is very poor. Following this approach, the low thermal conductivity points map the local fingerprint valleys structure, and the high thermal conductivity (i.e. having high heat conduction/transfer) points map the local fingerprint ridges structure, and intermediate thermal conductivity points correspond to the local transition zone between ridges and valleys.

One implementation of this thermal principle is described more closely in the international application no. WO 03098535. In this patent publication, separate resistors are used as heater and temperature sensing element. An array network of these resistors is deposited on a flexible substrate. A pixel consists of a resistive heater and a resistive temperature sensing element. Column and row lines are routed and connected directly to an external integrated circuit (ASIC) which contains all necessary electronic switches, operational amplifiers and processing circuitry. In operation, pixels are heated by the resistive heaters and pixel temperatures are monitored by the resistive sensing elements. Row and line switching is done on the ASIC. All pixels belonging to a sensor column are heated and processed at once, each column in turn. One end of the resistive sensing elements are connected to sensor rows and to be kept at a virtual potential reference by the operational amplifiers.

One major drawback of this implementation is that all pixels on a column are heated at the same time. This will result in a high power consumption, especially for larger sensor arrays with a high number of column pixels, assumed a given signal/noise ratio has to be maintained. Another potential issue is the varying resistive losses in upper column line paths when these carry large heating currents. This can result in inaccuracies and mismatches in pixel heating power and/or pixel signals (due to varying line voltage drops), and the larger array the worse. Compensations may be done to overcome this problem, for example by varying line widths to achieve identical line losses in column line paths, but this approach could not be done without a layout penalty. Inaccuracies and mismatches may also be compensated and corrected by image processing software, however, this adds complexity and requires more computing resources, especially for sensors used in portable embedded systems.

The present invention is a result of further development to the sensor principle described in the U.S. Pat. No. 6,091,837. An objective of the invention is to able to make the sensor physically compact and flexible, and with low enough power consumption in order to be used for example in wireless applications, such as in contact-less chipcards/smartcards. Another objective is to be able to implement a sensor being simple and cheap in production, and robust in long-term use.

SUMMARY OF THE INVENTION

On the above background this invention is generally directed to an apparatus for measuring a pattern in a surface of an object and comprising a plurality of sensor elements being responsive to a physical parameter of the object surface, as well as means for establishing an overall, segmented picture related to said pattern. The novel and specific features according to the invention primarily consist therein that the apparatus comprises at least one diode functionally associated with each sensor element for contributing to one or more of the following functions:
selectively addressing said sensor element
activating said sensor element, and
sensing of said physical parameter.

In the very interesting case of an object being at least partially heat conducting, in particular a fingerprint, the above at least one diode is adapted to be activated by being heated with an applied electric current, and/or the diode is comprised by the associated sensor element and is adapted to sense the temperature at the sensor element.

Other novel and specific features according to this invention are expressed in the attached claims.

The solution is presented in the following sections. In short, a simple sensor element or pixel structure is made and there is no active transistor inside the pixel elements. In spite of this, sensor pixels can still be addressed individually. Power consumption is kept at a low level, since only one or a very limited number of pixels are addressed and heated at a time. Practical problems with resistive column/row line losses can be eliminated, firstly by carrying low heating currents, and secondly by using current source(s) while detecting pixel thermal changes upon a heat excitation. Physical flexibility is achieved by using a flexible substrate. Further, sensor production costs can be minimized by preferably splitting the sensor in two main parts: a pixel array (large area) and a processing chip (small area). The pixel array can preferably be produced using large-area or roll-to-roll processing techniques, while the processing chip can be produced in semiconductor standard processes. The pixel array and the processing chip are then connected together by using conventional bonding techniques or flip-chip technology.

BRIEF DESCRIPTION OF THE DRAWINGS

In the following description embodiments of the invention will be explained more in detail with reference to figures of drawings.

DETAILED DESCRIPTION OF THE DRAWINGS

Figure 1:
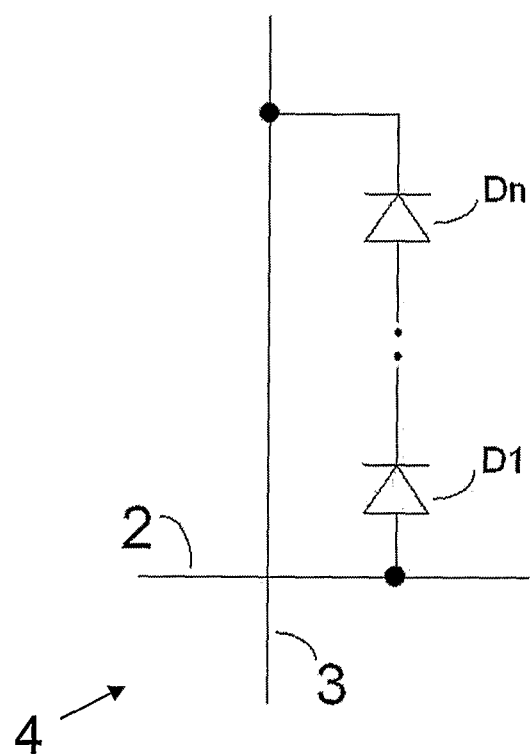
FIG. 1 in simplified form shows a single sensor element or pixel with a number of diodes as functional components, FIG. 2 in schematic cross-section shows an example of a possible type of diode that may be useful in the sensor elements, FIG. 3 in schematic cross-section shows an example of a possible "vertical" sensor element structure.

Reference is made to FIG. 1.

In a sensor element or pixel 4, one or more diodes D1-Dn are connected in series between pixel row line 2 and pixel column line 3, as illustrated in FIG. 1. The diodes D1-Dn should be close to the sensor surface and in good thermal contact with a fingerprint to be measured.

These pixel diodes D1-Dn in this embodiment will act both as pixel heater and temperature sensing element. Furthermore, as diode is a rectifier and when connected as illustrated and correctly biased, they will enable a simple pixel addressing, i.e. selecting/processing some pixel(s) of interest while deselecting/isolating all other pixels in the sensor array. Pixel addressing is done by controlling the potentials of pixel rows 2 and columns 3, in such a way that the selected pixel diodes D1-Dn are correctly biased (the current flows only through the selected pixel diode(s), while other pixels in the array are open-circuited/blocked). Thus, in this case the diodes or possibly one diode only, will perform all the functions of addressing, activating and sensing, as mentioned above.

The pixel is heated when these diodes D1-Dn are forward-biased with a given current $I_D$ and voltage $V_D$ across each diode. As diode is usually a temperature-sensitive device, any temperature change in a pixel will reflect a corresponding voltage change $\Delta V_D$ across each diode.

Pixel heating power and thermal signal can be defined as followed:

Pixel heating power: $n \cdot V_D \cdot I_D$

Thermal voltage signal: $n \cdot \Delta V_D$ (for a given constant diode current $I_D$)

where $n \geq 1$ is the number of pixel diodes connected in series. The number n is mainly limited by practical pixel circuit layout and fabrication, and by the diode's barrier height and the operating voltage of a sensor system.

The amount of voltage change $\Delta V_D$ in a pixel diode, upon heat excitation, will depend on local heat transfer with a fingerprint which is applied on the sensor surface. Ridge regions with better heat conduction (yielding larger heat loss) will normally have smaller voltage change $\Delta V_D$ than valley regions with poorer heat conduction (yielding smaller heat loss).

Alternatively, pixel diode can be kept at a constant bias voltage $V_D$. Any temperature change in a pixel will then reflect a correspondent current change $\Delta I_D$ through the diode(s). In this case, the parameter $\Delta I_D$ is used as pixel thermal signal.

A fingerprint image pattern is built by addressing, heating and collecting all pixel thermal signals in the sensor array. Differentials in either $\Delta V_D$ or $\Delta I_D$ will distinguish valleys and ridges, thus representing a fingerprint image. The diode(s) may be adapted to sense the temperature at each sensor element or pixel either intermittently or continuously.

There are several ways to construct a rectifier/diode in microelectronics. There also exist different diode types with their own characteristics suitable for different applications. The pixel diode(s) in this application can be any microelectronic device construction, with either purely or combined rectifying characteristic. The diode may preferably be, but not limited to, a PN-junction rectifier, a Schottky rectifier, or a PIN diode.

The diodes D1-Dn may be constructed from selected compound-semiconductor or semiconductor materials (preferably, but not limited to, Germanium or Silicon) and metal (for example aluminum, in case of some Schottky diodes) with suitable properties, or completely from organic materials. The atomic structures may be mono-crystalline, amorphous or poly-crystalline.

Figure 2:
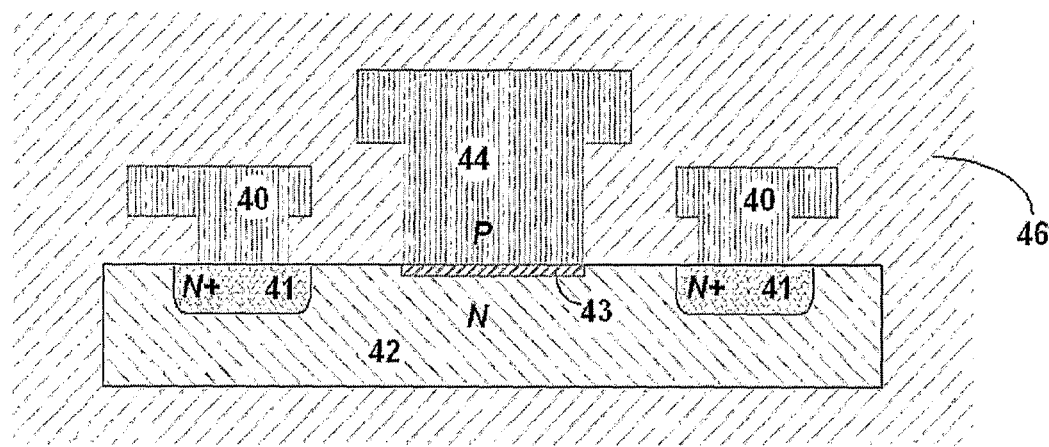

For illustration purpose, FIG. 2 shows an example of a lateral/planar Schottky rectifier, which is formed in the contact interface 43 between a semiconductor 42 (for example N-type Silicon) and a suitable metal 44 (for example aluminum). Metal contacts 40 and 44 are the diode terminals. The N+ islands 41 ensure that the contacts at the terminals 40 are ohmic contacts. An insulating oxide 46 may surround the diode device structure.

Figure 3:
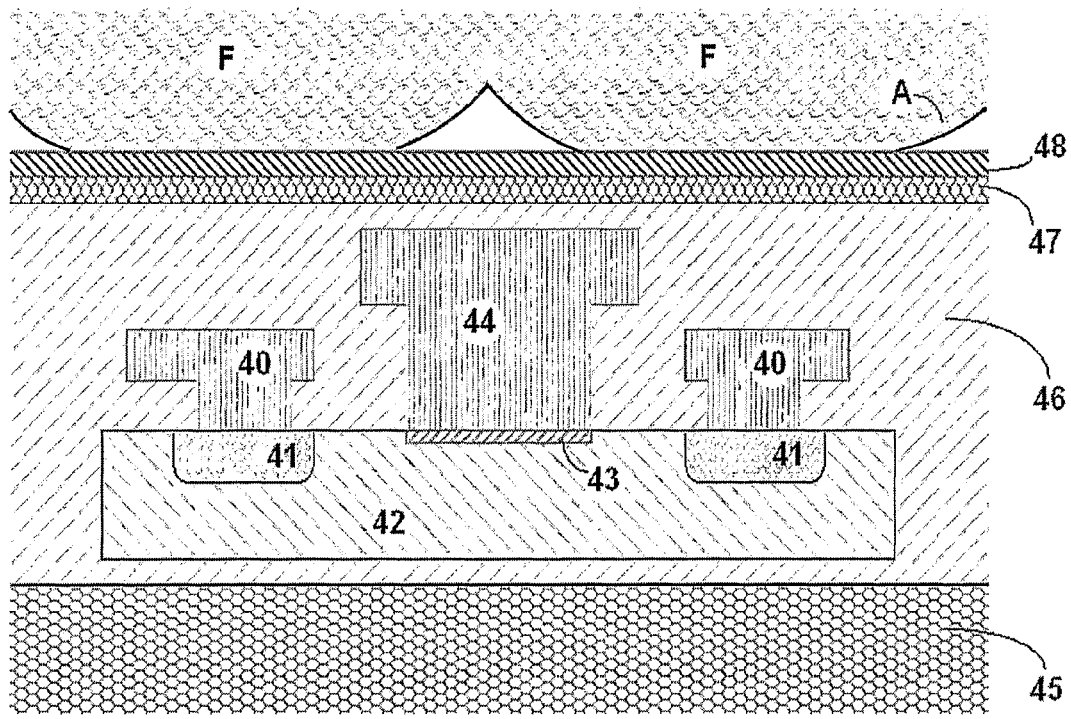

FIG. 3 is an example of the vertical structure of the sensor, drawn (not to scale) with a single diode D1 and with a fingerprint F with surface A applied on the sensor.

The substrate 45 can be rigid or preferably physically flexible. Substrate materials can be a plastic (for example PET, PEN . . . ), a metal foil (for example steel, aluminum . . . ) or semiconductor (for example silicon . . . ), quartz, glass or any material that is suitable for depositing microelectronic structures in production.

The insulator 46 may be an oxide from metal or semiconductor, or an organic material. Row 2 and column 3 connections can be made from a suitable metal (for example aluminum).

The sensor pixels are covered with a conductive/semiconductive layer 47 which should be grounded to shield the sensor electrically, and to protect the sensor from potentially harmful electromagnetic discharges upon accidental finger touching. A robust coating 48 on top can provide the mechanical and chemical protection in daily uses.

Figure 4:
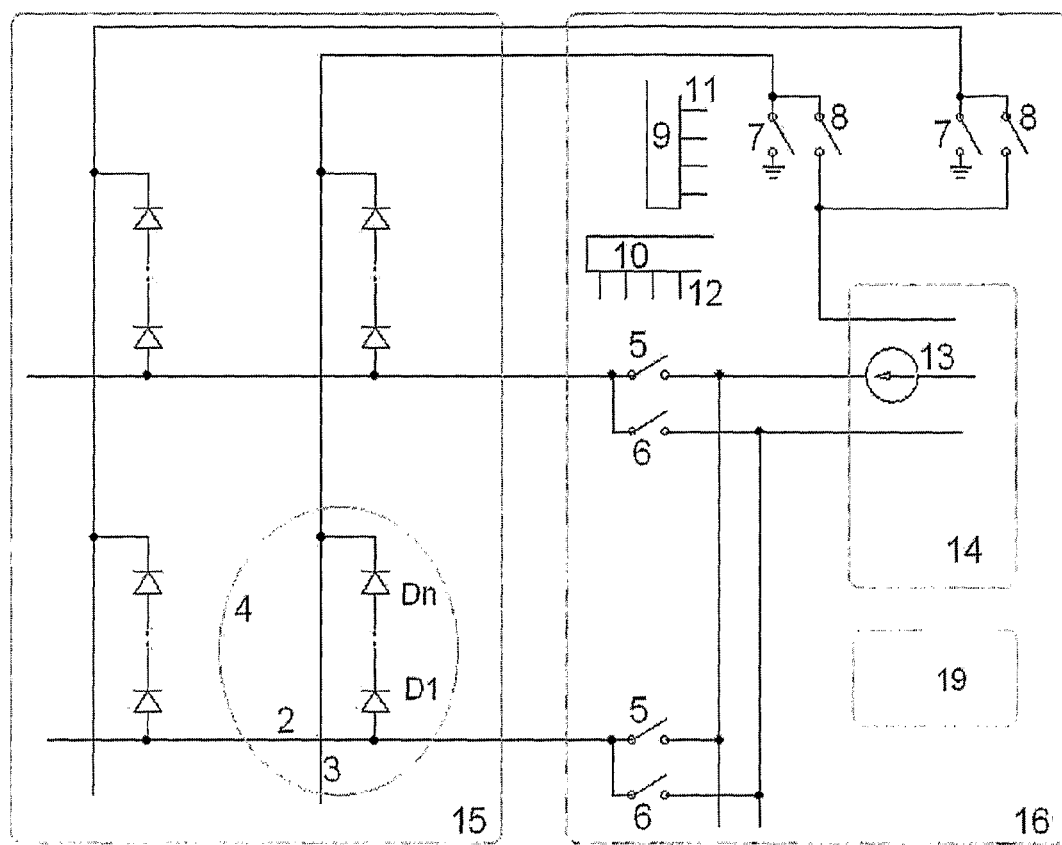
FIG. 4 shows an embodiment of a circuit configuration for a sensor array of relatively limited size.

FIG. 4 is a simplified diagram of a sensor system that preferably consists of two main parts: a pixel array 15 and a processing chip 16. Nevertheless, these two parts may also be integrated on a single common substrate.

The pixel array 15 is a two-dimensional network of pixels 4 with one or more diodes D1-Dn connected in series inside each pixel. Pixels 4 are connected to the global row 2 and column lines 3. Row 2 and column lines 3 are then routed and connected externally to the processing chip 16.

In the processing chip 16, there are switches for rows and columns. The column switches 7 and 8 are controlled by the outputs 11 of a column line selector 9 which may preferably be a shift register or a decoder logic. In the same way, the row switches 5 and 6 are controlled by the outputs 12 of a row line selector 10 which may preferably be a shift register or a decoder logic. For each column 3 and each row 2, there are preferably a main switch and a signal switch. The main switches 5 and 7 can handle large currents, while corresponding signal switches 6 and 8 will pass the sensor signals to an internal analogue circuit 14. The use of signal switches 6 and 8 can minimize the effects of noise and other irregularities in the main switches 5 and 7. For this purpose the signal switches are connected to the sensor pixel elements 4 at points between the sensor elements and respective main switches.

The switches 5, 6, 7 and 8 may be of any microelectronic devices that can perform the switching or equivalent functions. Additional circuit control may be needed to ensure a proper biasing and addressing of pixel diodes D1-Dn.

Current from a current source 13 is fed to the pixel being addressed. The current source 13 can be dynamically controlled and adjustable. Any changes in the selected pixel's thermal signal is monitored and processed by the internal analogue circuit 14, based on heat activation of one sensor pixel element at a time. In some instances it may be preferred to use a constant current source 13.

The processing chip 16 may also contain other circuit blocks 19 as well, for example the necessary electronics to perform complex fingerprint image processing, registration, fingerprint matching, and access control to applications. Anyhow, chip 16 in this embodiment provides means for establishing an overall, segmented picture related to the surface pattern to be measured, in particular a fingerprint.

This circuit configuration, as shown in FIG. 4, may be suitable for a sensor with a limited pixel array size. For a large pixel array, the high number of row 2 and column lines 3 to be connected externally will require many bonding pads and excessive contact areas, making the total sensor size impractical large (pixel array 15, processing chip 16 or both) for some applications.

Figure 5:
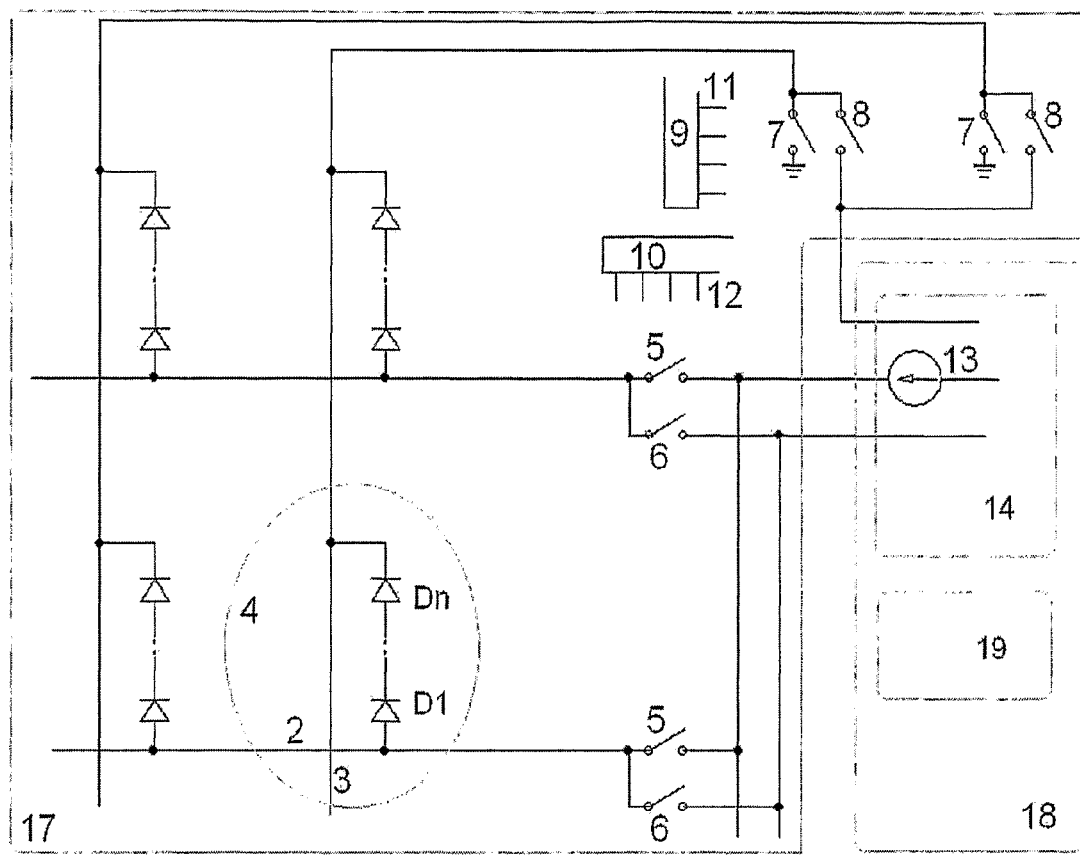
FIG. 5 shows another circuit configuration suitable for a larger array size than the one in FIG. 4, FIG. 6 in plan view and elevation, respectively, shows a practical arrangement of a sensor apparatus main parts FIG. 7 in a corresponding way as FIG. 1 shows a single pixel, but with a generic form of sensor element.

The circuit configuration of FIG. 5 is similar to FIG. 4, except that the row and column switching functions are totally incorporated in a now highly-integrated pixel array 17. The number of external connections to a now simpler processing chip 18 is then dramatically reduced to a few lines.

This configuration is preferred for larger sensor array size.

The switches and row/column line selectors may be constructed from thin-film transistors (TFTs) or semiconductor devices capable of performing the equivalent functions.

In order to maximize the array scanning speed in for example very large pixel arrays, several or a small group of pixels 4 may preferably be selected and processed at a time. In such cases, the sensor may be split into subsections for parallel processing.

Figure 6:
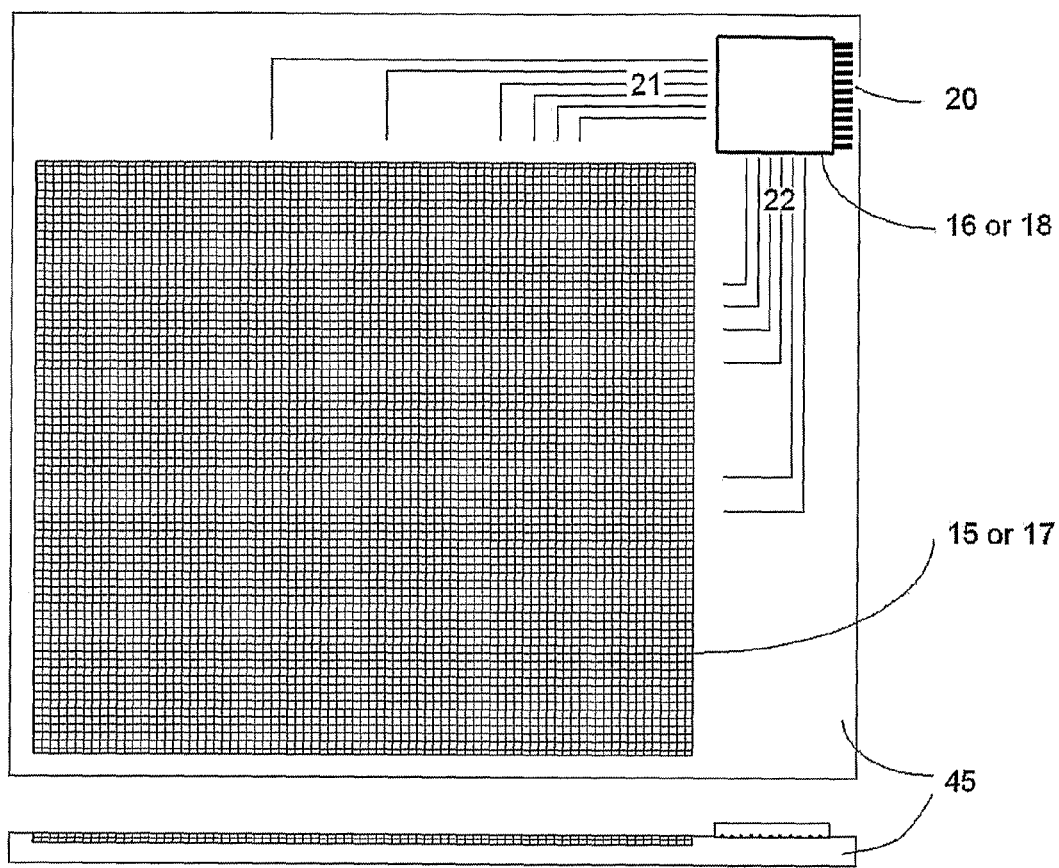

FIG. 6 is a top and side view of the sensor system.

The pixel array 15 (17) is made on a (flexible) substrate 45. The processing chip 16 (18) is bonded on the array substrate 45. Vertical 22 and horizontal connections 21 are routed and connected between these two parts.

In/Out lines 20 may be made available to be physically connected to an external system.

Figure 7:
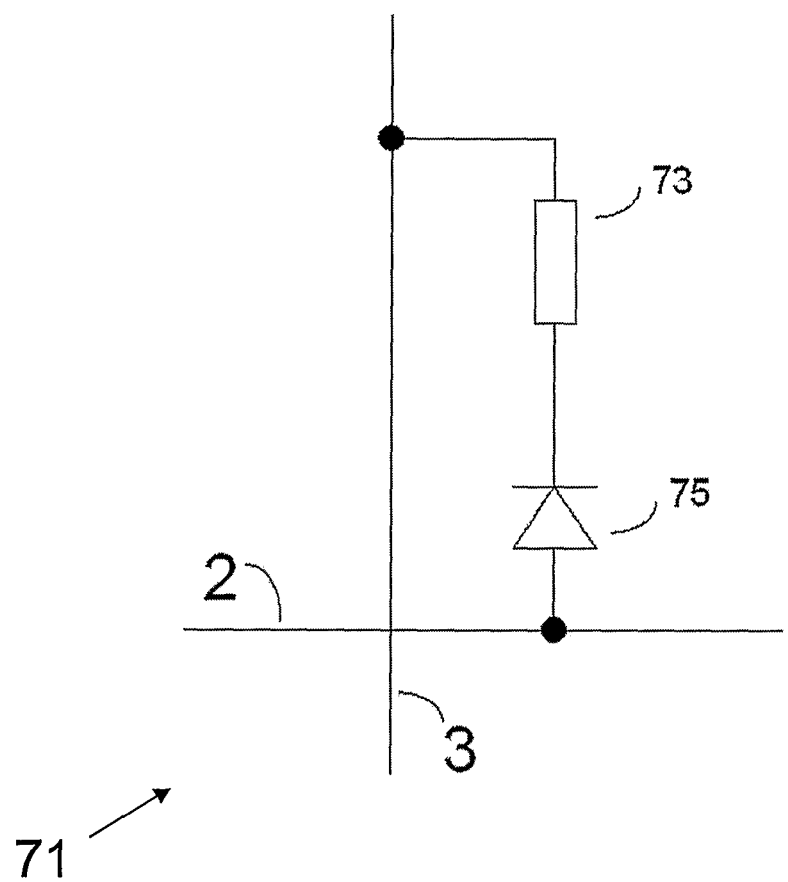

In the pixel circuit 71 in FIG. 7, there is a generic sensing element, here drawn in the form of a resistor 73, and a diode 75 connected in series between row 2 and column lines 3. Element 73 in addition to—or instead of—the sensing function, can contribute substantially to the required heating.

The diode 75 can be used purely for pixel addressing, as it will, when correctly biased, permit current flow in one direction while blocking current in the opposite direction. It can also be used partly as a sensing element together with the generic sensing element 73. This will depend on pixel structures, designs and applications.

The generic sensing element 73 can comprise a passive device (such as a resistor, capacitor, inductor . . . ) or any other type of devices of interest (such as a membrane switch, an active transistor/device . . . ).

For pixel heating and temperature sensing purposes in the current application (i.e. fingerprint image capturing), the diode 75 may preferably be used for pixel addressing purpose only. Under control by circuits 14, 16, 18 (FIGS. 4 and 5) there may be provided for selective addressing of one sensor pixel element or a small group of sensor elements at a time, by means of an array of diodes 75. In a practical apparatus a small group may range from 2-4 to more sensor elements, depending on possible subdivision of a large sensor array, time allotted for each overall segmented picture, required resolution, thermal_parameters and so forth.

The generic sensing element 73 may preferably be a resistive material to be used as a combined heating and temperature-sensitive resistor. Such resistor device should be made very close to the sensor surface in order to interact thermally with an applied fingerprint. When heated with a current flow, the resistive value will partly change according to the heat transfer with the fingerprint on the sensor surface. The change in resistive value is monitored and used as a measure for pixel thermal signal.

The rest of the sensor system or apparatus will remain the same as described in earlier sections above.

A diode structure is basically sensitive to temperatures and exposed lights, and a resistor material can be made to have an optimal response to temperatures, lights, or pressure. Thus, the ideas and basic structures of the present pixel and sensor system can also be further used to create an image or to perform other types of measurements based on light intensity, pressure and temperatures.

These types of measurements can also be of interest for fingerprint sensing.

However, as will be understood from the above description, the primary aspect of this invention is related to fingerprint sensing based on pixel thermal signal.

The invention claimed is:

1. Apparatus for measuring fingerprint patterns in skin, said apparatus comprising
   a sensor that includes a plurality of sensor elements configured to be responsive to a physical parameter of the skin, and
   means for establishing an overall, segmented picture related to said pattern coupled to the plurality of sensor elements, wherein the sensor elements are adapted to be activated by being heated with an applied electric current while the fingerprint is in contact with the sensor and to detect thermal changes in each sensor element due to heat loss from the sensor element to the skin during the heat activation, wherein upon the heat activation, sensor elements with relatively larger heat loss, thus smaller temperature changes, will map fingerprint ridges,
   and wherein each sensor element has either:
   at least one diode configured to selectively address said sensor element, activate said sensor element, and sense said physical parameter; or
   at least one diode configured to selectively address said sensor element and contribute to sensing said physical parameter and at least one resistor configured for activating/heating said sensor element and for sensing said physical parameter.

2. Apparatus according to claim 1, wherein said at least one diode is adapted to be activated by being heated with the applied electric current.

3. Apparatus according to claim 1, wherein each sensor element comprises a resistor connected in series with said at least one diode.

4. Apparatus according to claim 1, wherein each sensor element comprises a series connection of two or more diodes (D1-Dn).

5. Apparatus according to claim 1, wherein there is provided for heat activation of one sensor element at a time.

6. Apparatus according to claim 1, wherein heat activation of the sensor elements is provided for by a current source, and temperature sensing is performed on the basis of a voltage change caused by the heat activation.

7. Apparatus according to claim 1, wherein heat activation of the sensor elements is provided for by a voltage source, and temperature sensing is performed on the basis of a current change caused by the heat activation.

8. Apparatus according to claim 1, comprising controllable main switches for activation of sensor elements, and signal switches connected to sensor elements at points between the sensor elements and respective main switches.

9. Apparatus according to claim 1, wherein the sensor elements are arranged as a pixel array in rows and columns on one substrate part, and said means for establishing an overall, segmented picture is provided on another substrate part.

10. Apparatus according to claim 8, wherein said main and signal switches are provided on one substrate part.

11. Apparatus according to 9, wherein at least one of said substrate parts is flexible.

12. Apparatus according to claim 1, comprising control circuit means adapted to selectively address one sensor element or a small group of sensor elements at a time, by means of said at least one diode.

13. Apparatus according to claim 1, wherein heat activation of sensor elements is provided for by an electric current, and sensing of thermal changes is performed on the basis of a current change caused by the heat activation.

14. Apparatus according to claim 1, wherein the segmented picture is provided on a processing chip.

15. Apparatus according to claim 1, wherein the apparatus comprises more than one diode (D1-Dn) functionally associated with each sensor element, said more than one diode configured to give a thermal voltage signal proportional to n, the number of diodes connected in series, for activating/heating said sensor element, and sensing of said physical parameter.

16. Apparatus according to claim 1, wherein the apparatus is adapted to address and heat one sensor element at a time, or a small number of sensor elements at a time for parallel processing.

17. Apparatus according to claim 16, wherein said one sensor element or said small number of sensor elements are heated using a current source.

* * * * *